United States Patent
Kori (10) Patent No.: US 7,003,664 B2
(45) Date of Patent: Feb. 21, 2006

(54) SIGNAL RECORDING MEDIUM, CONTENT SIGNAL GENERATION APPARATUS, CONTENT SIGNAL REPRODUCTION METHOD, AND CONTENT SIGNAL REPRODUCTION APPARATUS

(75) Inventor: Teruhiko Kori, Kanagawa (JP)

(73) Assignee: Sony Corporation, Tokyo (JP)

( * ) Notice: Subject to any disclaimer, the term of this patent is extended or adjusted under 35 U.S.C. 154(b) by 812 days.

(21) Appl. No.: 10/096,035

(22) Filed: Mar. 12, 2002

(65) Prior Publication Data

US 2002/0159594 A1    Oct. 31, 2002

(30) Foreign Application Priority Data

Mar. 16, 2001  (JP) ............................ P2001-076723

(51) Int. Cl.
  *G06F 1/24*  (2006.01)
(52) U.S. Cl. .................... 713/165; 713/166; 713/167; 713/200; 713/201
(58) Field of Classification Search ................ 713/165, 713/166, 167, 200, 201
  See application file for complete search history.

(56) References Cited

U.S. PATENT DOCUMENTS 6,212,329 B1 * 4/2001 Sugahara ..................... 386/94

\* cited by examiner

*Primary Examiner*—Thomas R. Peeso
(74) *Attorney, Agent, or Firm*—Jay H. Maioli

(57) ABSTRACT

A content signal having a control signal added thereto indicating whether a playback restricting function for restricting reproduction is activated is recorded on a disk. When an encryption key generation section determines at the time of reproduction that the content signal has the control signal added thereto indicating that the playback restricting function is activated, it is determined whether a playback permission condition is satisfied. The playback permission condition is read from the disk, or acquired via a communication section if it is not stored on the disk. A correct encryption key (Kp) is supplied to an encryption processing section only when the playback permission condition is satisfied. The encryption processing section decrypts the encrypted content signal recorded on the disk with the encryption key (Kp) and the correctly decrypted content signal is outputted from an output control section.

23 Claims, 7 Drawing Sheets

SIGNAL RECORDING MEDIUM, CONTENT SIGNAL GENERATION APPARATUS, CONTENT SIGNAL REPRODUCTION METHOD, AND CONTENT SIGNAL REPRODUCTION APPARATUS

CROSS REFERENCE TO RELATED APPLICATIONS

The present document is based on Japanese Priority Document JP 2001-076723, filed in the Japanese Patent Office on Mar. 6, 2001, the entire contents of which are incorporated herein by reference to the extent permitted by law.

BACKGROUND OF THE INVENTION

1. Field of the Invention

The present invention relates to a recording medium, a content signal generation apparatus, a content signal reproduction method, and a content signal reproduction apparatus.

2. Description of the Related Art

In recent years, handling information of various contents such as video, audio, and text is becoming possible through digitization. When various contents are digitized and distributed, for example in a case where a recording medium having music, a movie or the like recorded thereon is sold, perfect copies can be readily and unlimitedly produced because the contents are recorded on the recording medium as digital signals. This is a huge merit for users, but becomes a problem for content providers in terms of right protection. Thus, in distributing digitized contents, technologies which can protect copyright without impairing the characteristics inherent in digital information have been put to practical use.

As such a technology for copyright protection, for audio contents, a copy control bit called SCMS (Serial Copy Management System) is provided with the content signal for example in digital audio tapes (DAT) or Mini Discs (MD). This copy control bit indicates whether copying is permitted, prohibited, or if the content has already been copied, and controls copy operation. For video contents, a copy control bit called CGMS (Copy Generation Management System) is provided, for example in the consumer digital video standard (DVC) and DVD-VR (Video Recording). This copy control bit indicates whether copying is permitted, permitted for one generation only, prohibited, or if the content has already been copied, and controls copy operation much like the SCMS. In addition, copy control information (CCI) called CQRT, under study for standardization of DVD-AR (Audio Recording), indicates not only information as to whether copying is permitted or not, but also information for controlling quality of audio and information as to whether copying of the associated content signals is permitted or not, and thus methods of controlling copy operation more closely have been proposed.

SUMMARY OF THE INVENTION

Since copy control with the SCMS, CGMS and the like simple controls whether copying content signals is permitted or not, it cannot limit the number of times the content can be played back or set a time limit for playback. Thus, when recording media pervasive in the market are used to provide contents, some services cannot be provided, for example, a preview service limiting the number of times the content can be played back or setting a time limit for playback, or providing contents inexpensively by controlling the number of times they can be played back and setting a time limit for playback.

Thus, the present invention provides a signal recording medium, a content signal generation apparatus, a content signal reproduction method, and a content signal reproduction apparatus capable of readily imposing restrictions on reproduction of content signals.

A signal recording medium according to an embodiment of the present invention has a content signal recorded thereon, the content signal having a control signal added thereto indicating whether or not a playback restricting function is activated for restricting reproduction of the content signal.

A content signal generation apparatus comprises a signal generation control section for supplying a control signal indicating whether or not a playback restricting function is activated for restricting reproduction of a content signal, and a signal generation section for adding to the content signal an information signal supplied from the signal generation control section to generate a content signal for distributing contents. The content signal generation apparatus further comprises an encrypting section for encrypting a content signal, and an encryption key generation section for generating an encryption key for use in encrypting the content signal by the encrypting section based on the information signal and a preset encryption key. The content signal generation apparatus further comprises an adding section for adding, to the content signal, test data enabling determination as to whether or not decrypting has been completed properly.

A method of reproducing a content signal comprises the steps of determining, when a content signal is reproduced, whether or not the content signal has a control signal indicating whether or not a playback restricting function is activated for restricting reproduction of the content signal, and when it is determined that the content signal has the control signal, outputting the content signal when a playback permission condition for allowing reproduction of the content signal is satisfied.

A content signal reproduction apparatus judges whether or not a content signal has a control signal indicating whether or not a playback restricting function for restricting reproduction of the content signal is activated, and comprises a setting signal generation section for outputting a setting signal which enables output of the content signal, when it is determined that the content signal has the control signal and a playback permission condition for allowing reproduction of the content signal is satisfied, and an output processing section for performing output processing of the content signal using the setting signal from the setting signal generation section. The content signal reproduction apparatus further comprises a communication section, and the setting signal generation section acquires the condition signal through the communication section when the condition signal cannot be extracted from the content signal. In addition, the content signal reproduction apparatus further comprises a storage section preinstalled for storing the condition signal, and the setting signal generation section acquires the condition signal when the condition signal cannot be extracted from the content signal. The content signal reproduction apparatus further comprises a notifying section for notifying status of operation, and when the output processing section does not determine using the test data that the decrypting has been properly completed, the notifying section notifies that the content signal cannot be outputted.

In one embodiment of the present invention, the content signal has the control signal added thereto indicating whether or not the playback restricting function for restricting reproduction of the content signal is activated, and the content signal is encrypted with the new encryption key generated based on this information and the preset encryption key. The content signal also has the condition signal added thereto indicating the playback permission condition of the content signal when the playback restricting function is activated, and the content signal is encrypted with the new encryption key generated using the condition signal as well. The encrypted content signal having the control signal and the condition signal added thereto is recorded on the recording medium or distributed via a communication channel as a signal for distributing contents. The content signal also has the test data added thereto enabling determination as to whether or not decrypting has been completed properly.

When the content signal is reproduced, it is determined whether or not the content signal has the control signal indicating whether or not the playback restricting function for restricting reproduction of the content signal is activated. When it is determined that the content signal has the control signal and if the content signal's playback permission condition or the playback permission condition acquired through the communication channel is satisfied, the new encryption key generated based on the information signal and the preset encryption key is used to decrypt the content signal. If the content signal has the playback permission condition, the new encryption key generated using the condition signal indicating the playback permission condition is also used to decrypt the content signal. When the content signal has the test data added thereto enabling determination as to whether or not decrypting has been properly completed, the content signal is outputted if it is determined by the test data that decrypting has been properly completed, and it is notified that the content signal cannot be outputted if it is not determined by the test data that decrypting has been properly completed.

According to a preferred embodiment of the present invention, the control signal is added to the content signal indicating whether or not the playback restricting function for restricting reproduction of the content signal is activated, and when the content signal is reproduced, whether it has the control signal added thereto or not is detected. Thus, reproduction of the content signal can be restricted by activating the playback restricting function with the control signal.

In addition, the content signal has the condition signal added thereto indicating the playback permission condition of the content signal when the playback restricting function is activated, and when the content signal is reproduced, whether the playback permission condition is satisfied or not is determined, and the content signal is reproduced if the playback condition is satisfied. As a result, by changing the playback permission condition, restrictions on reproduction of the content signal can be changed freely.

If the playback restricting function is activated, and the condition signal indicating the playback permission condition has not been added to the content signal, the playback permission condition is acquired at the time of content signal reproduction, and the content signal is reproduced when the acquired playback permission condition is satisfied. Thus, playback restrictions can be imposed even on kinds of content signals to which the playback permission condition cannot be added. Also, since the playback permission condition can be freely set even after the content signal is distributed, various playback control operations can be achieved. In addition, since the control over reproduction of the content signal requires only the addition of the control signal, an existing signal format can be easily adapted so as to enable restriction of content signal reproduction.

The content signal is encrypted with an encryption key generated using the control signal indicating whether the playback restricting function is activated or not and the preset encryption key, or an encryption key generated using the control signal indicating whether or not the playback restricting function is activated or not, the preset encryption key and the condition signal indicating the playback permission condition. In reproducing the content signal, when the playback permission condition is satisfied, the encryption key used in encryption is generated using the control signal, the preset encryption key, and the condition signal, and decrypting is performed with the generated encryption key. Thus, reproduction can be readily controlled for the encrypted content signal only by changing the method of generating the encryption key using an existing encryption system. Since the encryption key is generated using the control signal and the condition signal, the correct encryption key cannot be obtained if the control signal or the condition signal is tampered with, and the control signal or the condition signal need not be encrypted since they are not used directly for decryption. That is to say, signals to be encrypted do not increase. Thus, the present invention allows the use of conventional content signal encryption formats without significant changes.

Furthermore, since a notification is displayed or sounded when reproduction of the content signal is restricted, it is possible to readily determine whether the content signal is not being outputted due to an abnormality in the reproduction apparatus or a playback restriction.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which.

DESCRIPTION OF THE PREFERRED EMBODIMENTS OF THE PRESENT INVENTION

Figure 1:
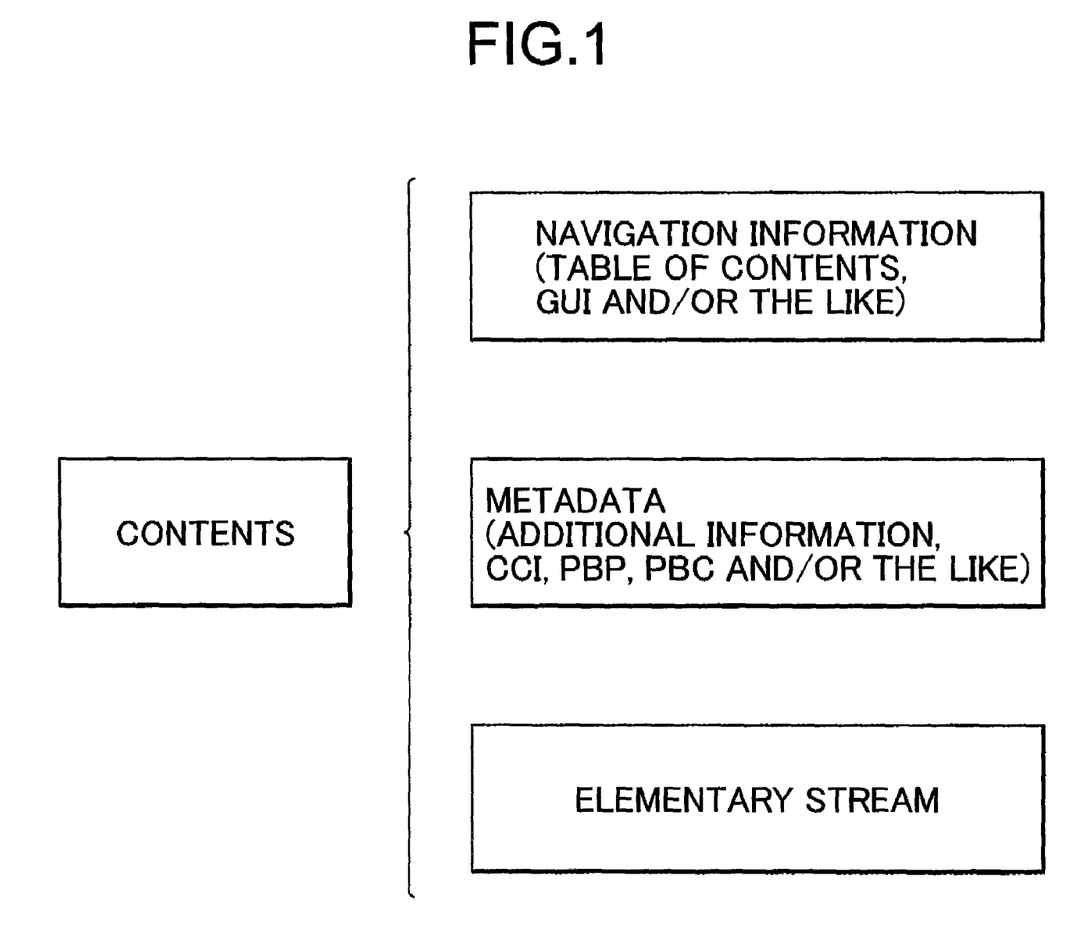
FIG. 1 is a schematic diagram showing, for example, the structure of audio contents on DVD.

Below, an embodiment of the present invention will be described with reference to the drawings. FIG. 1 shows the structure of contents, for example audio, on a DVD.

The contents comprise navigation information, metadata, and an elementary stream. The navigation information comprises a table of contents, a GUI and the like. The metadata normally comprises additional information pertaining to the contents such as the artists' names and lyrics, and copy control information CCI. The elementary stream comprises linear PCM audio data, audio data compliant with the MPEG (Moving Picture Experts Group) audio standard or the like. In the present invention, a PBP (Playback Permission Bit) is added to the metadata as a control signal indicating whether or not a playback restricting function for restricting reproduction of content signals is activated. In addition, PBC (Playback Condition Information) can be provided with the metadata as a condition signal indicating a playback permission condition.

Figure 2:
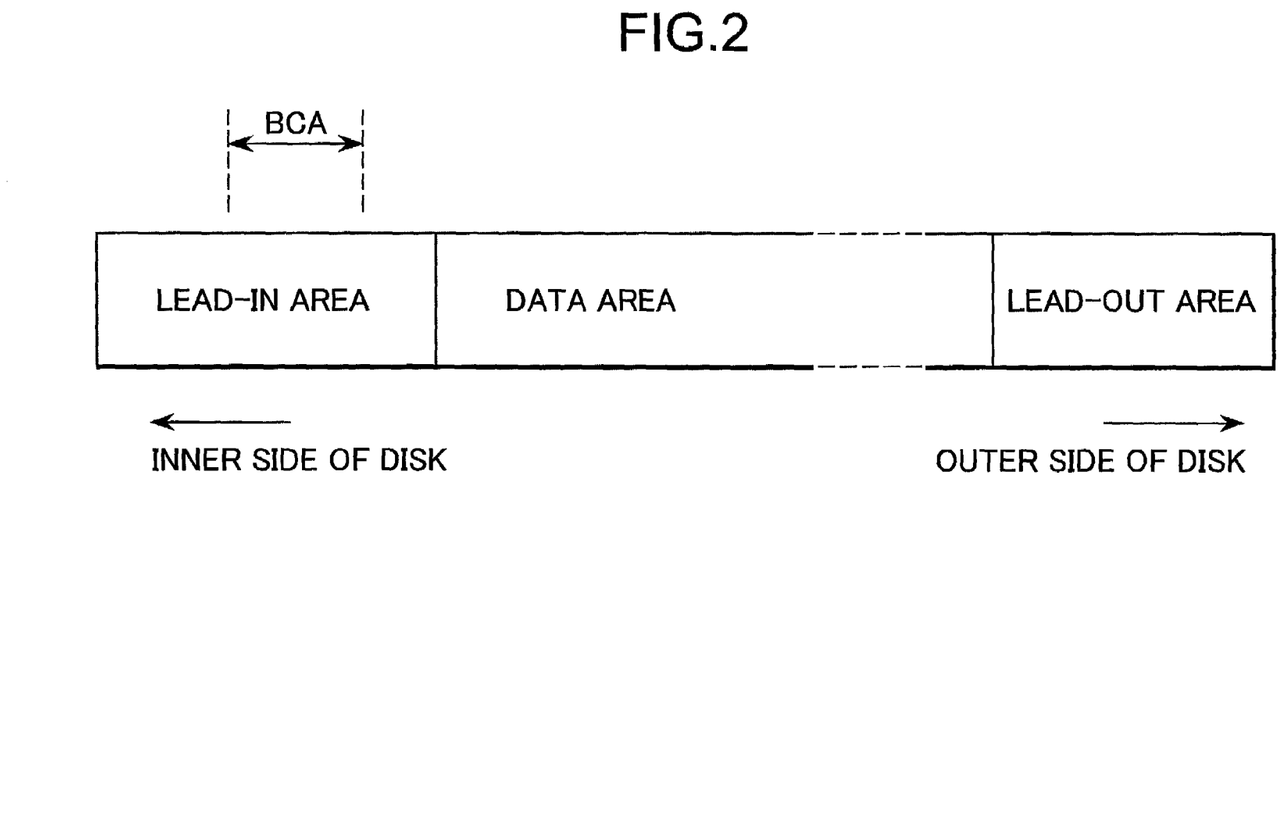
FIG. 2 is a schematic diagram showing an example of a structure of a DVD.

FIG. 2 shows the disk structure of a DVD (Digital Versatile Disc) which is a signal recording medium for content signals. A lead-in area is provided in an innermost area of the disk in which information such as physical specifications of the disk and a content provider are indicated. The content provider information contains a disk key for use in decrypting encrypted contents recorded in a data area later described. The lead-in area can be provided with a BCA (Burst Cutting Area) in which information specific to the disk, for example data such as a serial ID of the disk, can be recorded in bar code form with a laser cutter. The area outside of and adjacent to the lead-in area is a data area where content signals are recorded. A lead-out area defining the end of the data area is provided on the outer side of the data area, and a laser light irradiation spot can be moved within the range between the lead-in area and the lead-out area.

In DVD standards, when a disk is recordable or rewritable, a UDF (Universal Disk Format) file system is used. Alternatively, when a disk is play-only, a file system called "UDF Bridge" is used to support both standards of ISO 9660 (ISO stands for International Organization for Standardization) used as a CD-ROM standard and UDF (Universal Disk Format).

When the content signals are of audio contents, the content signals are recorded on the disk with an AUDIO-TS directory configuration in the aforementioned file system. For example, the table of contents or the like are recorded as AUDIO-TS.IFO data, the additional information pertaining to the contents as ATS (Audio Title Set). IFO data, and the audio data as ATS.AOB data. The copy control information CCI, the playback permission bit PBP, and the playback condition information PBC are provided in a sector header portion of the content data recorded in units of sectors, or are recorded as files in the data area. It should be noted that the recording positions of the copy control information CCI, the playback permission bit PBP, and the playback condition information PBC are not limited to the aforementioned ones.

When the AUDIO-TS directory information is recorded on a disk to produce a play-only disk, a CSS (Content Scrambling System) authentication method is used, and the content signals are encrypted with an encryption system called CPPM (Content Protection for Prerecorded Media) and the encrypted content signals are used to produce a disk.

Figure 3:
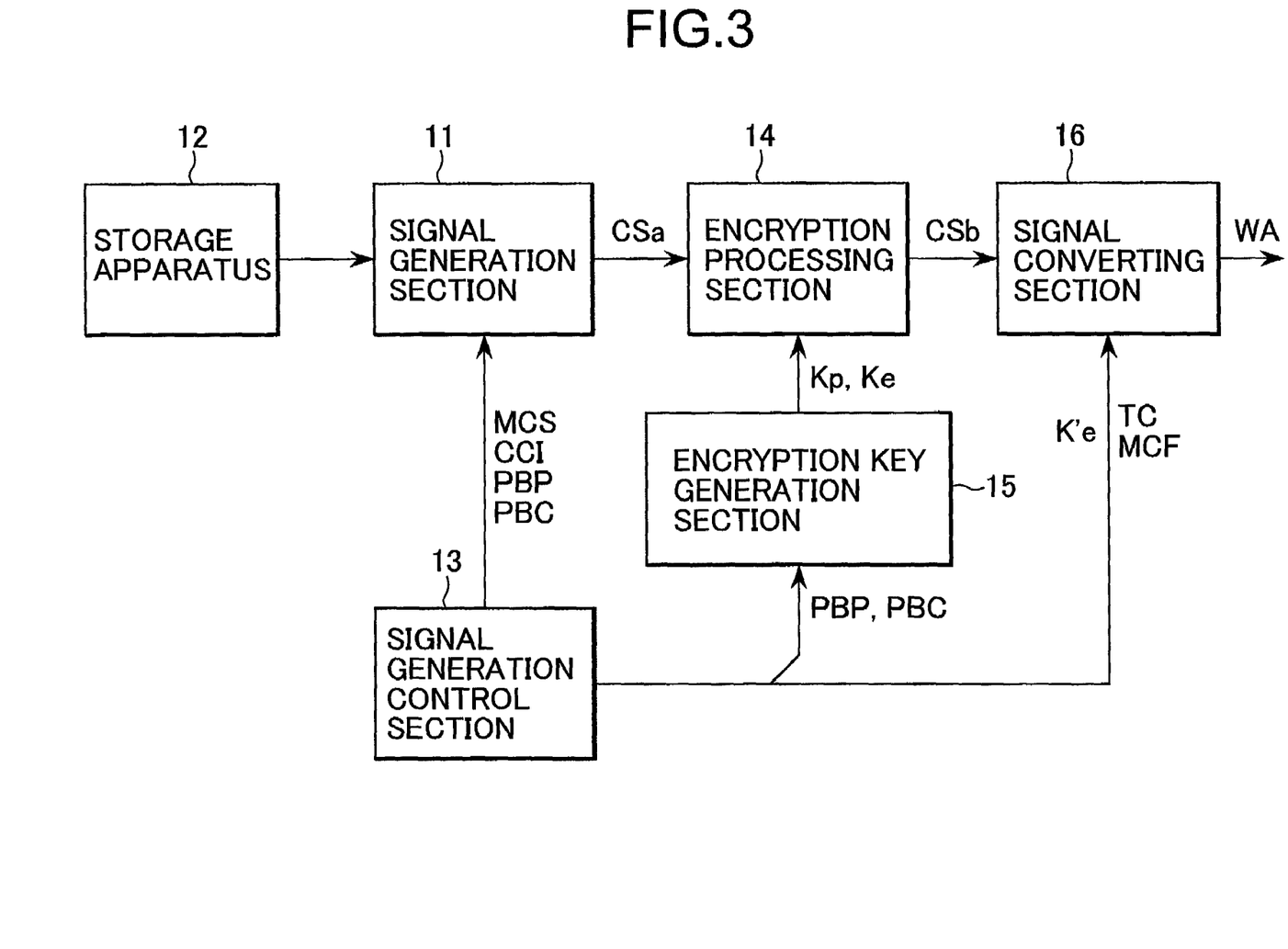
FIG. 3 is a block diagram showing the structure of a content signal generation apparatus according to a preferred embodiment of the present invention.

FIG. 3 is a block diagram showing the configuration of a content signal generation apparatus according to an embodiment of the present invention. A signal generation section 11 reads audio data, navigation information, and additional information pertaining to contents stored in a storage apparatus 12 to generate, based on a control signal MCS supplied from a signal generation control section 13, a signal CSa constituting the contents. When a copy restriction or a playback restriction is imposed, the signal generation control section 13 supplies the copy control information CCI or the playback permission bit PBP to the signal generation section 11 to add these signals to the signal CSa constituting the contents. When a playback permission condition used in operating a playback restricting function is added, a playback condition information PBC indicating the playback permission condition is supplied to the signal generation section 11. The signal CSa thus generated at the signal generation section 11 is supplied to an encryption processing section 14.

The signal generation control section 13 supplies the signal generation section 11 with the control signal MCS, various information and the like as described above, and also supplies an encryption key generation section 15 with the playback permission bit PBP and the playback condition information PBC for generating an encryption key for use in encrypting the signal CSa generated at the signal generation section 11. The signal generation control section 13 also supplies a signal converting section 16 with TOC (Table Of Contents) information TC to be recorded in the lead-in area and a control signal MCF for controlling a signal conversion operation.

When a CPPM encryption is performed, the encryption key generation section 15 not only supplies the encryption processing section 14 with an encryption key Ke of each disk as is conventional, but also performs encryption using the supplied playback permission bit PBP in addition to using the encryption key Ke when a playback restricting function is utilized for content signals. For example, the encryption key generation section 15 generates an encryption key Kpbp from the playback permission bit PBP, generates a new encryption key Kp from this encryption key Kpbp and the conventionally used encryption key Ke of each disk, and supplies the generated encryption key Kp to the encryption processing section 14.

In order to generate the new encryption key Kp, the encryption key Kpbp is generated, for example, from the playback permission bit PBP based on a predetermined algorithm, and a predetermined operation is performed using the encryption key Kpbp and the encryption key Ke. In so doing, since compatibility of key lengths with conventional encryption systems can be maintained if the key length of the encryption key Kp is made equal to that of the encryption key Ke, the required changes for adding the playback permission bit PBP can be reduced. In addition, by making the key length of the new encryption key Kp longer than that of the encryption key Ke, the encryption can readily be made more robust. Also, the encryption key Ke of each disk for use in generating the encryption key Kp is encrypted, for example, with a master key Km assigned to each manufacturer to generate an encryption key Ke' which is supplied to the signal converting section 16.

When content signals are generated using the playback condition information PBC as well, the playback condition information PBC is supplied to the encryption key generation section 15 to generate an encryption key Kpbc based on the playback condition information PBC. The new encryption key Kp is generated using not only the encryption keys Ke and Kpbp but also the encryption key Kpbc.

The encryption processing section 14 encrypts the signal CSa using the encryption key Kp supplied from the encryption key generation section 15 and supplies the resulting signal as a signal CSb to the signal converting section 16. The encryption key generation section 15 may also individually supply the encryption keys Ke, Kpbp, and Kpbc to the encryption processing section 14, which repeatedly performs encryption using each encryption key, and supplies the resulting signal to the signal converting section 16. If the new encryption key Kp is generated for encryption, however, encryption processing can be performed the way it has been conventionally just by adding the generation process of generating the new encryption key, enabling a reduction in changes required for providing the playback restricting function. In addition, when the encryption processing section 14 encrypts the signal CSa to generate the signal CSb, it performs encryption such that the playback permission bit PBP and the playback condition information PBC can be separated from the signal CSb.

The signal converting section 16 generates a content signal using the encrypted signal CSb, and the TOC information, the encryption key Ke' and the like supplied from the signal generation control section 13 and converts the content signal to a format suited for a recording medium of choice to generate a recording signal WA. The recording signal WA is used to produce a master disk which is used to form a stamper. The stamper can be used to easily and readily produce DVDs capable of restricting reproduction of the content signal.

For a recordable or rewritable DVD, a disk apparatus having a content signal recording function performs encryption, for example with an encryption system called CPRM (Content Protection for Recordable Media) and records the encrypted signals on the disk. Unlike play-only disks, when the content signals are recorded, the disk does not have the encryption key Ke specific to the disk encrypted with the master key Km recorded thereon. Thus, the encryption key Ke is generated, for example, using information specific to the disk recorded in the BCA provided in the lead-in area as described above, and the encryption key Ke is used to perform encryption. Alternatively, encryption is also performed using an encryption key Kt generated for each track to enable protection of recorded music by piece. In addition, for performing playback control, the new encryption key Kp is generated also using the playback permission bit PBP as described above, and the encryption key Kp is used to perform encryption.

In the aforementioned CPRM encryption, the encryption key Kpbp generated from the playback permission bit PBP is used to generate the encryption key Kp which is used to perform encryption. However, when the playback permission condition is set to restrict reproduction of contents, the playback condition information PBC indicating the playback permission condition is recorded on the disk, and the encryption key Kpbc is generated based on the playback condition information PBC to generate the new encryption key Kp using not only the encryption keys Ke, Kpbp but also the encryption key Kpbc.

Figure 4:
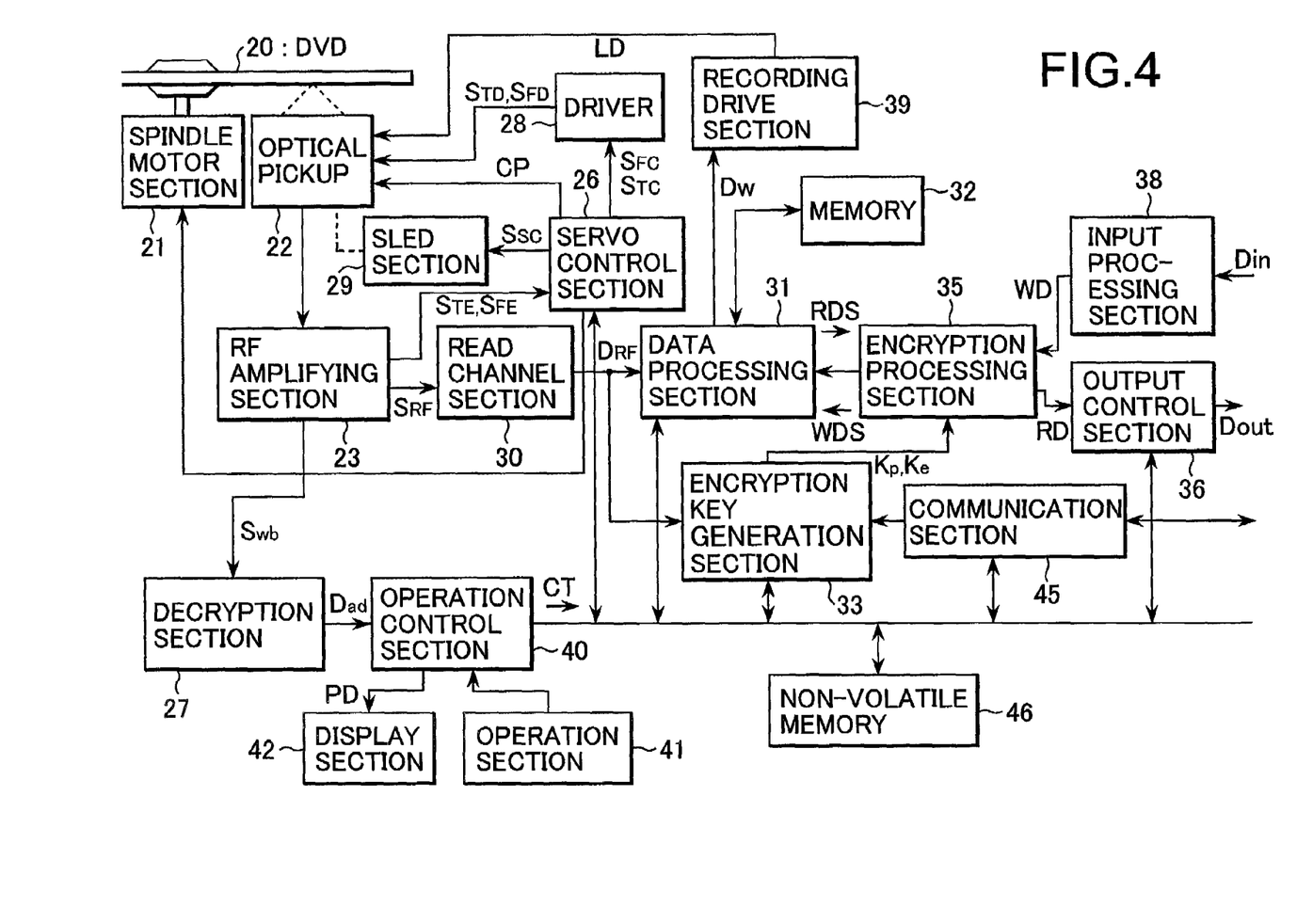
FIG. 4 is a block diagram showing the structure of a disk apparatus according to a preferred embodiment of the present invention.

Next, FIG. 4 shows the structure of a disk apparatus, according to an embodiment of the present invention, for recording and reproducing content signals using the playback permission bit PBP and the playback condition information PBC as well, as described above.

A DVD 20 is rotated at a predetermined speed by a spindle motor section 21. The spindle motor section 21 is driven to rotate the DVD 20 at the predetermined speed based on a spindle control signal Ssp from a servo control section 26 later described.

The DVD 20 is irradiated with a laser light of a controlled light amount from an optical pickup 22. The laser light reflected by the DVD 20 irradiates a light detecting section (not shown) of the optical pickup 22. The light detecting section performs opto-electric conversion and current-voltage conversion based on the reflected laser light, and generates a voltage signal at a signal level according to the light amount of the reflected laser light and supplies the signal to an RF amplifying section 23.

The RF amplifying section 23 generates a read-out signal SRF using the voltage signal from the optical pickup 22 and supplies it to a read channel section 30. The RF amplifying section 23 also generates a tracking error signal STE and a focus error signal SFE and supplies them to the servo control section 26. When the disk apparatus supports, for example DVD+RW, the RF amplifying section 23 generates a wobble signal Swb and supplies it to a decryption section 27.

The servo control section 26, based on the supplied focus error signal SFE, generates a focus control signal SFC for controlling an objective lens (not shown) of the optical pickup 22 such that the focal position of laser light matches the position of a recording layer of the DVD 20, and supplies the signal SFC to a driver 28. The servo control section 26, based on the supplied tracking error signal STE, also generates a tracking control signal STC for controlling the objective lens of the optical pickup 22 such that the irradiated position of the laser light matches the central position of a desired track, and supplies the signal STC to the driver 28.

The driver 28 generates a focus drive signal SFD based on the focus control signal SFC and generates a tracking drive signal STD based on the tracking control signal STC. The generated focus drive signal SFD and the tracking drive signal STD are supplied to an actuator (not shown) of the optical pickup 22 to control the objective lens such that the laser light comes into focus at the central position of a desired track.

The servo control section 26 generates a sled control signal SSC for moving the optical pickup 22 in the radial direction of the DVD 20 such that the irradiated position of the laser light does not fall outside the tracking control range, and supplies the signal SSC to a sled section 29. The sled section 29 drives a sled motor based on the sled control signal SSC to move the optical pickup 22 in the radial direction of the DVD 20. The servo control section 26 also supplies a laser output control signal CP to the optical pickup 22 to control the output of laser light irradiating the DVD 20 to be of a desired level.

Based on the wobble signal Dad, the decryption section 27 generates an address signal Dad indicating a position on the disk, and supplies the signal Dad to an operation control section 40. The read channel section 30 performs asymmetric compensation and binarization on the supplied readout signal SRF to convert it to a digital signal which is supplied as a data signal DRF to a data processing section 31 and an encryption key generation section 33.

The data processing section 31 performs 8/16 demodulation of the data signal DRF and error correction processing with Reed-Solomon product codes and the like using a RAM (Random Access Memory) 32. The data signal on which the error correction processing has been performed is supplied as a data signal RDS to an encryption processing section 35.

The encryption key generation section 33 serving as a setting signal generation section determines whether or not the supplied data signal DRF has the playback permission bit PBP set to activate the playback restricting function. When it is determined that it has the playback permission bit PBP set to activate the playback restricting function while also satisfying the playback permission condition, the encryption key generation section 33 generates a setting signal enabling correct output of a content signal, that is, the encryption key Kp for correctly decrypting the encrypted data signal RDS, and supplies it to the encryption processing section 35 serving as an output processing section. When the playback restricting function is not utilized, or the playback permission condition is not satisfied, the encryption key generation section 33 supplies the encryption key Ke to the encryption processing section 35 as in conventional disk apparatuses.

Figure 5:
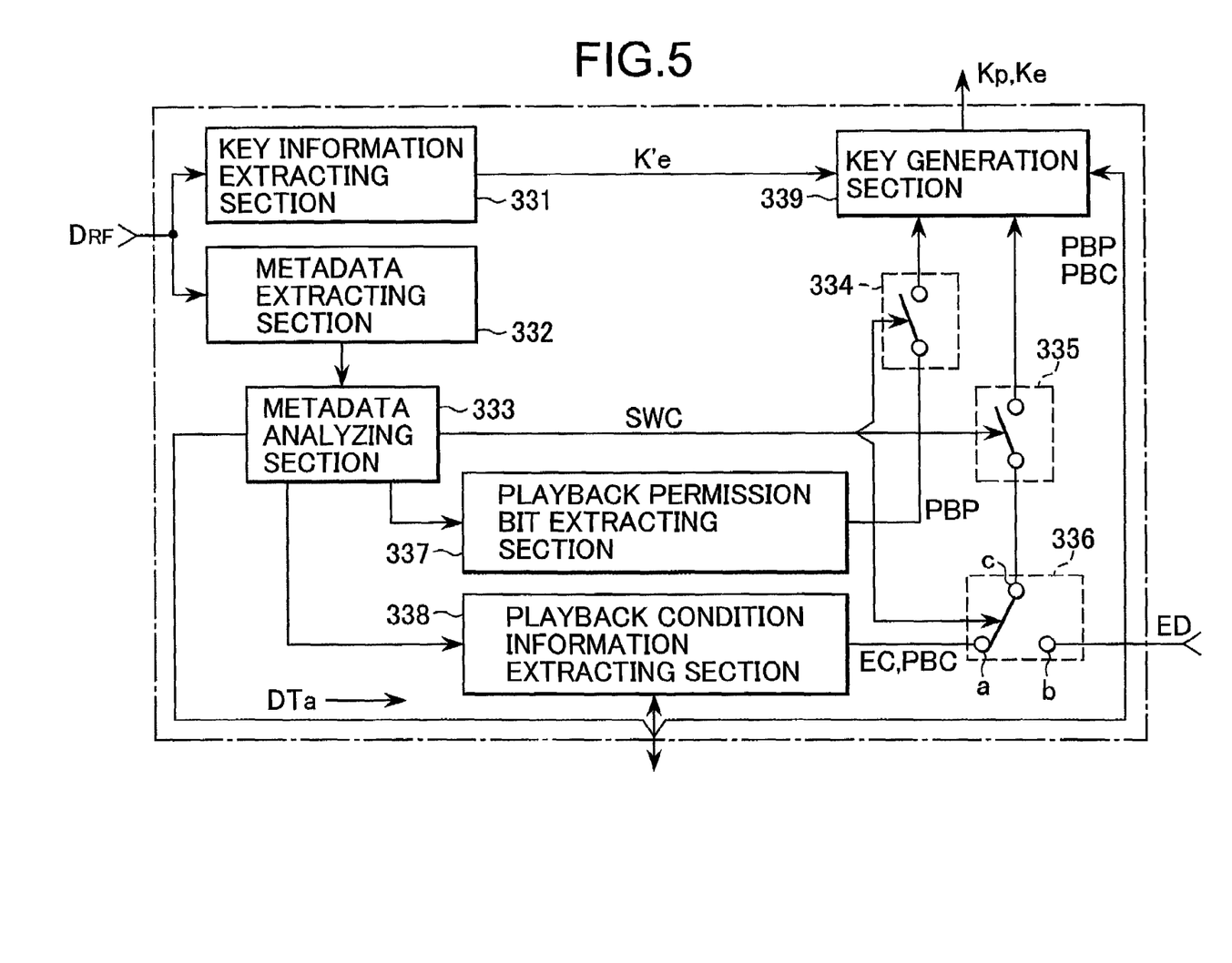
FIG. 5 is a diagram showing the structure of an encryption key generation section according to a preferred embodiment of the present invention.

FIG. 5 shows the configuration of the encryption key generation section 33 according to an embodiment of the present invention. A key information extracting section 331 of the encryption key generation section 33 extracts the encryption key Ke' encrypted with the master key Km and the information specific to a disk recorded in the BCA area, and supplies them to a key generation section 339. A metadata extracting section 332 extracts the metadata of the contents and supplies the metadata to a metadata analyzing section 333.

Based on the extracted metadata, the metadata analyzing section 333 detects the playback permission bit PBP and the playback condition information PBC. If the playback permission bit PBP is detected and the detected playback permission bit PBP is set to activate the playback restricting function, a switch 334 and a switch 335 are turned on with a switch control signal SWC. If the playback permission bit PBP is not present, or the playback permission bit PBP is not set to activate the playback restricting function, the switch 334 and switch 335 are turned off. If the playback condition information PBC is present, a movable terminal c of a switch 336 is turned to the side of a terminal a. If the playback condition information PBC is not present, the movable terminal c of the switch 336 is turned to the side of a terminal b. In addition, the metadata analyzing section 333 supplies the operation control section 40 with a detection signal DTa indicating the detection results of the playback permission bit PBP and the playback condition information PBC.

The switch 334 has one terminal connected to a playback permission bit extracting section 337 and the other terminal connected to the key generation section 339. The playback permission bit extracting section 337 extracts the playback permission bit PBP from the metadata. The extracted playback permission bit PBP is supplied to the key generation section 339 via the switch 334.

The switch 335 has one terminal connected to the movable terminal c of the switch 336 and the other terminal connected to the key generation section 339. The terminal a of the switch 336 is connected to a playback condition information extracting section 338 and the terminal b thereof is connected to a communication section 45 later described.

The playback condition information extracting section 338 extracts the playback condition information PBC from the metadata and determines whether or not the playback permission condition indicated by the playback condition information PBC is satisfied. If it is determined that the playback permission condition is satisfied, the playback condition information extracting section 338 generates a permission signal EC for permitting reproduction of the content signal and supplies it to the key generation section 339 via the switches 336, 335. The playback condition information extracting section 338 may supply the playback condition information PBC to the key generation section 339 when it is determined that the playback permission condition is satisfied.

When a condition signal ED indicating the playback permission condition is supplied from outside via the communication section 45 connected to the switch 336, the condition signal ED is supplied to the key generation section 339 through the switches 336, 335.

The key generation section 339 decrypts the encryption key Ke' encrypted with the master key Km to generate the encryption key Ke, or generates the encryption key Ke based on the information specific to the disk. When the playback permission bit PBP is set to activate the playback restricting function and reproduction is permitted with the permission signal EC and the condition signal ED, the key generation section 339 generates the encryption key Kpbp based on the playback permission bit PBP. In addition, when the encryption key Kpbp is not generated, the key generation section 339 supplies the encryption key Ke to the encryption processing section 35, and when the encryption key Kpbp is generated, generates the new encryption key Kp from the encryption key Ke and the encryption key Kpbp and supplies it to the encryption processing section 35. If the key generation section 339 is supplied with the playback condition information PBC from the playback condition information extracting section 338, it generates the encryption key Kpbc based on the playback condition information PBC, generates the new encryption key Kp from the encryption key Kpbc, the encryption key Ke, and the encryption key Kpbp, and supplies the key Kp to the encryption processing section 35. In this manner, the encryption key generation section 33 supplies different encryption keys to the encryption processing section 35 depending on whether or not the playback restricting function is utilized and whether or not the playback permission condition is satisfied.

The encryption processing section 35 decrypts the data signal RDS using the encryption key supplied from the encryption key generation section 33 and supplies the resulting signal as a data signal RD to an output control section 36. If the encryption key Ke is supplied from the encryption key generation section 33 to the encryption processing section 35 in reproducing a content signal having the playback permission bit PBP and encrypted with the encryption key Kp, the encryption processing section 35 supplies a signal which has not been decrypted correctly as the data signal RD to the output control section 36. If the encryption key Kp is supplied from the encryption key generation section 33 to the encryption processing section 35, the encryption processing section 35 supplies a signal which has been decrypted correctly as the data signal RD to the output control section 36. In reproducing a content signal without the playback permission bit PBP, the encryption processing section 35 supplies a correctly decrypted signal to the output control section 36 since the content signal was encrypted with the encryption key Ke.

The output control section 36 determines, using test data, for example parity, whether or not the data signal RD has been correctly decrypted, and if the signal is legitimate, removes the parity from the decrypted data signal RD and outputs the resulting signal as a content output signal Dout.

In order to provide the function of adding the test data enabling determination as to whether decrypting is correctly completed or not, the signal generation section 11 in FIG. 3 is set to add to the data, for example, the aforementioned parity as the test data by units by which the data is compressed, for example in units of frames, when compressing and recording audio data. In addition, in recording linear PCM audio data, by adding the parity by the same units as the compressed and recorded audio data, the signal generation section 11 shown in FIG. 3 and the output control section 36 in FIG. 6 can be used in common regardless of the type of signal of audio data.

Figure 6:
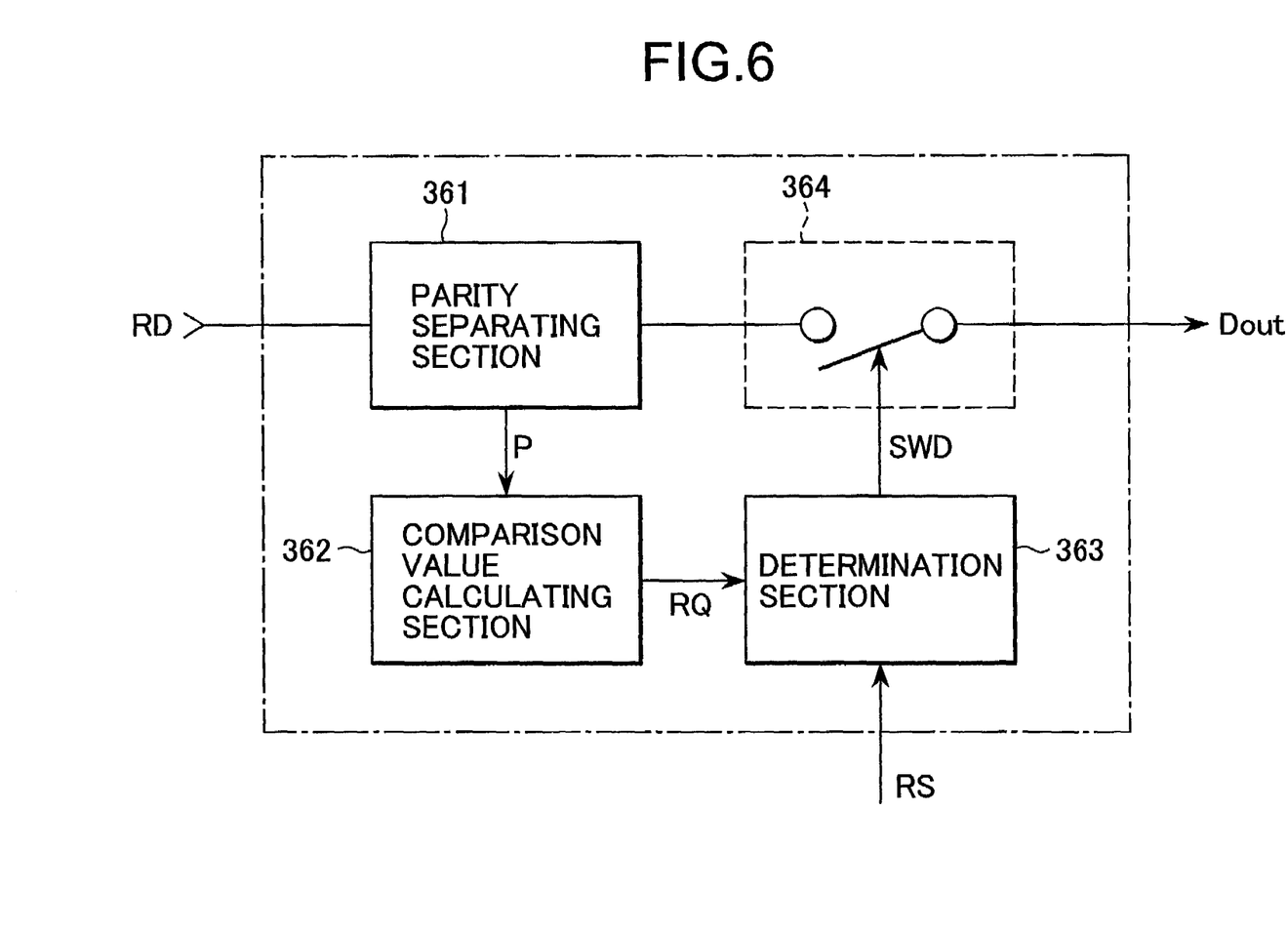
FIG. 6 is a diagram showing the structure of an output control section according to a preferred embodiment of the present invention.

FIG. 6 shows the configuration of the output control section 36. The data signal RD is supplied to a parity separating section 361 to separate therefrom a parity P added to the content signal.

Since this parity P is set to be added to the content signal by predetermined units as described above, the parity separating section 361 separates the data corresponding to the parity P from the data signal RD and supplies it to a comparison value calculating section 362. The data having the data corresponding to the parity P removed is supplied to a switch 364. If the encryption processing section 35 has performed decrypting with the correct encryption key, the parity separating section 361 correctly separates the parity P. If the encryption processing section 35 has performed decrypting with an incorrect encryption key, the data separated by the parity separating section 361 is different from the parity P added by the predetermined units.

When certain data are provided, the comparison value calculating section 362 calculates a comparison value RQ using a signal processing function which can derive a numerical value corresponding to the data. For example, the Hash function is preset, and the data separated by the parity separating section 361 is substituted into the function to calculate the comparison value RQ which is supplied to a determination section 363.

The determination section 363 is supplied with an initial value RS derived with the correct parity P from the operation control section 40, later described. When the initial value RS is equal to the comparison value RQ supplied from the comparison value calculating section 362, a switch control signal SWD turns on the switch 364.

In brief, the output control section 36 determines that decrypting has been performed with the correct encryption key at the encryption processing section 35 when the data separated as the parity by the parity separating section 361 is equal to the parity added to the content signal. At this point, the signal whose parity has been removed is outputted as the content output signal Dout from the output control section 36.

When the initial value RS is not equal to the comparison value RQ, the output control section 36 determines that decrypting has been performed with an incorrect encryption key at the encryption processing section 35, and turns off the switch 364 to prevent the incorrect content signal from being outputted from the output control section 36. In addition, the output control section 36 notifies the operation control section 40 that the initial value RS is not equal to the comparison value RQ, and the operation control section 40 displays on a display section 42, later described, the fact that the content signal is not reproduced. The fact that the content signal is not reproduced may be notified by sound or the like. Notification in this manner of the fact that the content signal is not reproduced enables a distinction to be made easily from a case where the content signal is not reproduced due to an abnormality in the disk apparatus.

Next, in recording a content signal, when a content signal Din is supplied, this signal is supplied to an input processing section 38. The input processing section 38 adds the parity P serving as the test data by the predetermined units to the content signal Din as described above. When the input processing section 38 is supplied with the playback permission bit PBP and the playback condition information PBC from the operation control section 40, it adds these signals to the content signal and supplies the resulting signal to the encryption processing section 35 as a content signal WD to be recorded on the DVD 20.

The key generation section 339 of the encryption key generation section 33 is supplied with the playback permission bit PBP, the playback condition information PBC and the like from the operation control section 40, and generates the new encryption key Kp with the encryption key Ke which uses information specific to the disk, the encryption key Kt for each track, the playback permission bit PBP, and the playback condition information PBC as described above for the CPRM encryption system. The generated encryption key Kp is supplied to the encryption processing section 35.

The encryption processing section 35 encrypts the content signal WD using the supplied encryption key Kp and supplies it as a content signal WDS to the data processing section 31.

The data processing section 31 performs the process of generating the data signal RDS from the data signal DRF in reverse in order to generate a recording signal Dw from the content signal WDS and supplies it to a recording drive section 39. The recording drive section 39 generates a laser driving signal LD based on the recording signal Dw and supplies it to the optical pickup 22. The optical pickup 22 controls the output of laser light according to the laser driving signal to record the content signal on the DVD 20.

The operation control section 40 is connected to an operation section 41 and the display section 42, and generates a control signal CT based on an operation signal PS from the operation section 41 and supplies it to the respective sections to cause operations to be performed according to operations on the operation section 41. The operation control section 40 also supplies the display section 42 with a display signal PD to display the information recorded on the DVD 20, the operating status of the disk apparatus, and the like. The operation control section 40 performs control of the operations such as the encryption and decryption of the content signal and the generation of the encryption key, the operation of acquiring the playback permission condition via the communication section 45, and the operation of supplying the initial value RS to the output control section 36 to output only the correct content signal.

The communication section 45 acquires the playback permission condition via a communication channel if the DVD 20 or disk apparatus does not have the playback permission condition. It also communicates various information via the communication channel. The disk apparatus also has a non-volatile memory 46 which can hold the playback permission condition and information on reproduction of the content signal.

Next, the reproduction operation of a content signal using the playback permission bit PBP and the playback condition information PBC is described. First, the operation when the playback permission bit PBP set to activate the playback restricting function is present and the playback condition information PBC is not present is described. In this case, a process of acquiring the playback condition information PBC is performed, and it is determined whether the playback permission condition is satisfied or not. If it is determined that the playback permission condition is satisfied, the encryption key Kpbp is generated based on the playback permission bit PBP, and the encryption key Kpbp is used to generate the correct encryption key Kp.

For example, in reproducing the content signal, the playback permission condition is requested to the content provider side or content manager side which manages distribution of the contents through the communication section 45. The content provider or content manager communicates with the content signal reproduction apparatus and determines what content signal is reproduced by which apparatus to manage the content signal usage. As the playback permission condition for the disk apparatus which made the request, the provider or manager supplies a signal for permitting reproduction of the content signal as the condition signal ED. The supplied condition signal ED is supplied to the key generation section 339 via the switch 336 and the switch 335. Since the condition signal ED permits reproduction of the content signal, the key generation section 339 generates the encryption key Kpbp based on the playback permission bit PBP, generates the encryption key Kp using the encryption key Ke and the generated encryption key Kpbp, and supplies it to the encryption processing section 35. Thus, the contents can be correctly decrypted with the encryption key Kp. In addition, by providing the playback permission bit PBP for the disk, the content provider or content manager can manage reproduction of the content signal on the disk apparatus side and can charge for reproduction of the content signal. A content usage fee maybe collected by various methods, for example by including it in a telephone charge, or by charging separately.

If the playback condition information PBC is not present, a process of acquiring the playback condition information PBC is performed. Thus, the playback condition information PBC is supplied, for example via the communication section 45, to allow the playback permission condition to be freely set or changed even after the content signal has been distributed, thereby enhancing flexibility in the playback restricting operation on the content signal.

The encryption key generation section 33 may automatically permit reproduction of a content signal if the playback permission bit PBP set to activate the playback restricting function is added to the content signal, and usage information indicating the usage status of the content signal, for example the number of times or duration of reproduction of the content signal, may be stored in the non-volatile memory 46 for each content to prevent tampering. The content provider or content manager can charge reproduction of the content signal as in the aforementioned case by reading out, at given intervals, the usage information stored in the non-volatile memory 46 through the communication section 45.

Alternatively, a usage charge may be paid in advance to allow playback of contents according to the paid usage charge. For example, a prepaid card that has the allowed number of reproduction of a content signal set thereon according to a purchase price is made, and the disk apparatus is provided with a card processing section (not shown) capable of reading or updating the information on the prepaid card. When the content signal having the playback permission bit PBP set to activate the playback restricting function is reproduced, a user purchases the prepaid card and loads it into the card processing section (not shown). The card processing section updates the information on the remaining allowed number of usages of the prepaid card each time the content signal is reproduced, and if the allowed number of usages is exhausted, the encryption key generation section 33 is prohibited from generating the correct encryption key Kp. Consequently, reproduction of the content signal can be restricted to the amount corresponding to the purchase price.

Next, the operation when the playback permission bit PBP set to activate the playback restricting function and the playback condition information PBC are present is described. The playback condition information extracting section 338 extracts the playback condition information PBC from a content signal to determine whether the playback permission condition is satisfied or not. If it is determined that the playback permission condition is satisfied, the playback condition information extracting section 338 supplies the permission signal EC to the key generation section 339 which generates the correct encryption key Kp. If it is not determined that the playback permission condition is satisfied, the playback condition information extracting section 338 stops supplying the permission signal EC to the key generation section 339 to prohibit the key generation section 339 from generating the correct encryption key Kp.

For example, when the playback condition information PBC indicates the number of reproductions, the disk apparatus makes the non-volatile memory 46 hold information on the number of reproductions of the content signal having the playback permission bit PBP set to activate the playback restricting function in correspondence with information specific to the disk and information specific to the disk title. When the content signal having the playback permission bit PBP set to activate the playback restricting function is reproduced, if the number of reproductions held in the non-volatile memory 46 has not reached the number of reproductions indicated by the playback condition information PBC, the permission signal EC is supplied to the key generation section 339 which is caused to supply the correct encryption key Kp to the encryption processing section 35. In addition, the number of reproductions stored in the non-volatile memory 46 is incremented by one to update the information on the number of reproductions. Thereafter, when the number of reproductions reaches the number indicated by the playback condition information PBC, the supplying of the permission signal EC to the key generation section 339 is stopped to prohibit the correct encryption key Kp from being supplied to the encryption processing section 35.

Since the number of reproductions of contents is limited by specifying the number of reproductions in the playback condition information PBC, a preview service or the like with a limited number of reproductions can be readily provided.

When a disk having a recordable area is used, the information indicating the number of reproductions may be written into this area. In this case, the number of reproductions of contents can be limited to the number of reproductions indicated by the playback condition information PBC of the contents even when the information indicating the number of reproductions is not stored in the non-volatile memory 46.

In addition, the playback condition information PBC may set a time period for allowing reproduction as well as the number of reproductions. For example, the playback condition information PBC is set to permit reproduction of a content signal for a predetermined number of days after the initial use, and the disk apparatus acquires the correct date information and time information and operates with these correct date information and time information.

When the content signal is reproduced for the first time, this time of usage of the content signal is registered in the non-volatile memory 46 of the disk apparatus or the recordable area of the disk using the correct date information and time information. Then, each time the content signal is reproduced, it is determined whether or not the time period indicated by the playback condition information PBC has elapsed since the time of the initial usage. When the time period indicated by the playback condition information PBC has elapsed, the supply of the permission signal EC to the key generation section 339 is stopped. In other words, the correct encryption key Kp is generated and supplied to the encryption processing section 35 during the time period indicated by the playback condition information PBC. Once the time period has elapsed, the generation of the correct encryption key Kp is prohibited to prevent correct decrypting at the encryption processing section 35, thereby making it possible to restrict the use of the content signal to within the predetermined time period.

While the aforementioned embodiment has been described for reproduction of content signals recorded on DVDs, the recording medium is not limited to DVDs and may be any other optical disk, a magnetic recording medium or a recording medium formed by using a semiconductor device.

Figure 7:
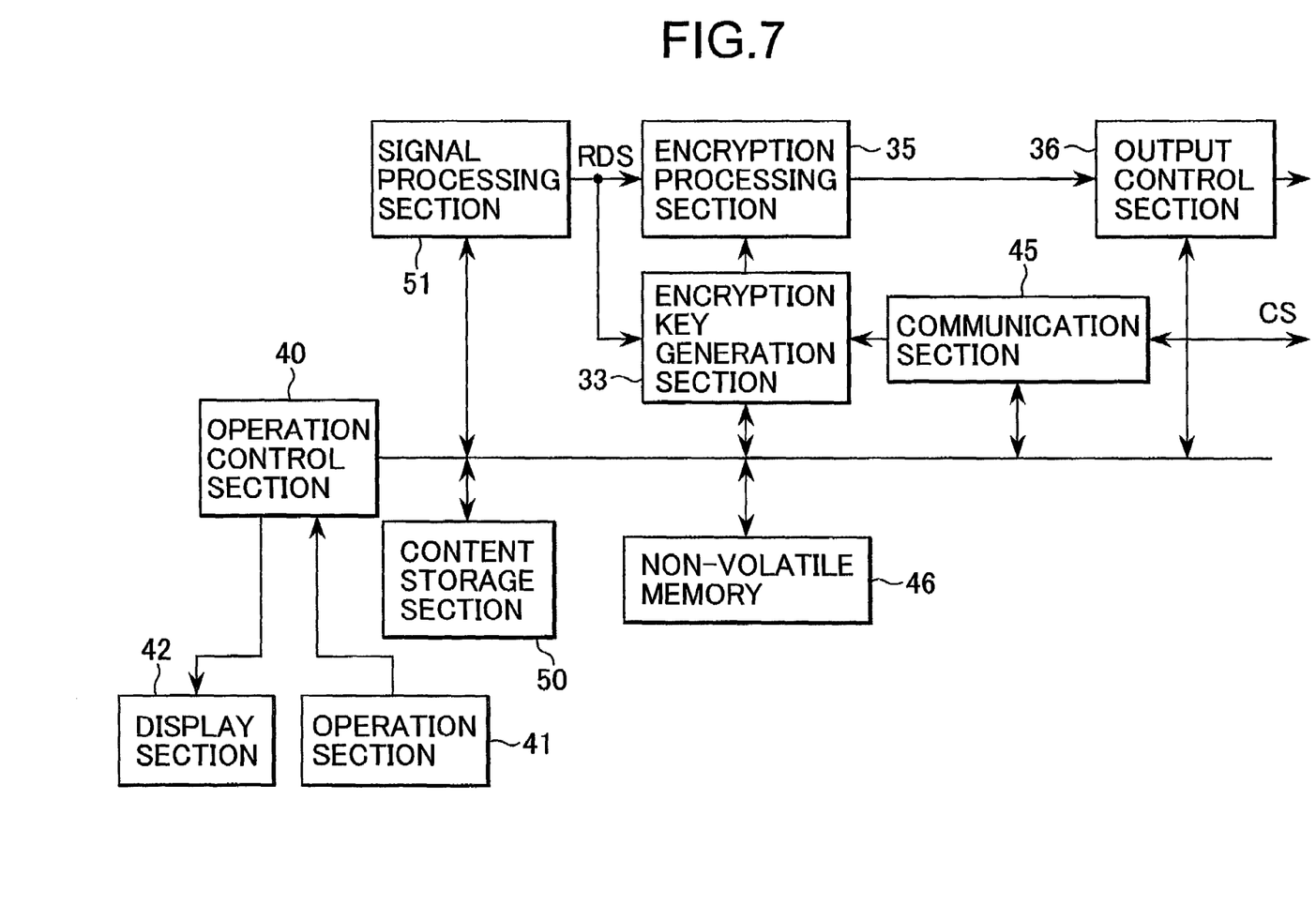
FIG. 7 is a block diagram showing the structure of a reproduction apparatus for distributed content signals according to a preferred embodiment of the present invention.

In addition, the content signal subjected to playback restriction may be a content signal distributed through a wireless or wired transmission path as well as a content signal recorded on a recording medium. In this case, there production of the content signal can be restricted similarly to the aforementioned case by adding to the content signal a control signal indicating whether or not a playback restricting function is activated for restricting reproduction of the content signal and a condition signal indicating a playback permission condition of the content signal when the playback restricting function is activated. FIG. 7 shows a content signal reproduction apparatus in this case. In FIG. 7, components corresponding to those in FIG. 4 are designated with the same reference numerals, and detailed description thereof is omitted.

In FIG. 7, a content signal CS supplied via a communication section 45 is stored in a content storage section 50 formed with a hard disk, and a semiconductor memory or the like. At the time of content signal reproduction, a desired content signal CS is read from the content storage section 50 and supplied to a signal processing section 51 and an encryption key generation section 33.

The signal processing section 51 performs expansion processing or the like if the content signal CS is compressed, and supplies a signal RDS after expansion to an encryption processing section 35. The encryption key generation section 33 detects whether or not the content signal CS read from the content storage section 50 or the signal RDS outputted from the signal processing section 51 has the playback permission bit PBP and the playback condition information PBC. In addition, the encryption key generation section 33 generates an encryption key based on the detection result and the determination on whether or not the playback permission condition is satisfied. Thus, similarly to the aforementioned case, the output of the content signal from an output control section 36 can be controlled to restrict reproduction of the distributed content signal CS.

In the aforementioned embodiment, the playback restriction is performed on the content signal encrypted to enhance a copy restricting function, and the output of the correct content signal is restricted depending on whether the generation of the encryption key for use in decrypting the encrypted content signal or on whether the decrypting has been correctly performed or not. The content signal, however, is not limited to encrypted signals. For a non-encrypted content signal, the reproduction thereof can be restricted, for example, by performing output only when the playback restricting function is effective and the playback permission condition is satisfied.

It should be understood that the signal recording medium and content signal generation apparatus and content signal reproduction method and content signal reproduction apparatus of the present invention are not limited to the description of the preferred embodiments herein, inasmuch as the present invention is capable of other embodiments and of being practiced or carried out in various ways, and that it is intended to cover all changes and modifications of the examples of the invention herein chosen for the purposes of the disclosure. Accordingly, any variations, combinations and sub-combinations of the present preferred embodiments should be permitted without departing from the technical scope of the invention.

What is claimed is:

1. A signal recording medium having a content signal recorded thereon, wherein said content signal includes a control signal added thereto indicating whether a playback restricting function is activated for restricting reproduction of said content signal,
    wherein said content signal has test data added thereto enabling determination as to whether decryption has been completed properly.

2. The signal recording medium according to claim 1, wherein said content signal is recorded with a condition signal added thereto indicating a playback permission condition of said content signal when said playback restricting function is activated.

3. The signal recording medium according to claim 2, wherein said content signal comprises a signal encrypted with a new encryption key generated based on said control signal, a preset encryption key, and said condition signal.

4. The signal recording medium according to claim 1, wherein said content signal comprises a signal encrypted with a new encryption key generated based on said control signal and a preset encryption key.

5. A content signal generation apparatus comprising:
    a signal generation control section for setting a playback restricting operation for a content signal by supplying a control signal indicating whether a playback restricting function is activated for restricting reproduction of a content signal; and
    a signal generation section for adding said control signal supplied from said signal generation control section to said content signal to generate a content signal for content distribution.

6. The content signal generation apparatus according to claim 5, wherein said signal generation control section also generates a condition signal indicating a playback permission condition of said content signal when said playback restricting function is activated, and said signal generation section generates said content signal for content distribution by adding said condition signal as well.

7. The content signal generation apparatus according to claim 6, further comprising:
    an encrypting section for encrypting a content signal; and
    an encryption key generation section for generating an encryption key for use in encrypting said content signal by said encrypting section based on said control signal, a preset encryption key, and said condition signal.

8. The content signal generation apparatus according to claim 5, further comprising:
    an encrypting section for encrypting a content signal; and
    an encryption key generation section for generating an encryption key for use in encrypting said content signal by said encrypting section based on said control signal and a preset encryption key.

9. The content signal generation apparatus according to claim 5, further comprising an adding section for adding, to said content signal, test data enabling determination as to whether decryption has been completed properly.

10. A method of reproducing a content signal comprising the steps of:
   determining, when a content signal is reproduced, whether said content signal has a control signal indicating whether a playback restricting function is activated for restricting reproduction of said content signal; and
   when it is determined that said content signal has said control signal, outputting said content signal when a playback permission condition allowing reproduction of said content signal is satisfied
   wherein, when said playback permission condition is satisfied, an encryption key is generated based on said control signal and key information included with said content signal, and a content signal which has been decrypted using said encryption key is outputted.

11. The method of reproducing a content signal according to claim 10, wherein when said content signal includes a condition signal indicating a playback permission condition and said playback condition is activated, said content signal is outputted when the condition indicated by said condition signal is satisfied.

12. The method of reproducing a content signal according to claim 10, wherein said content signal is outputted when said content signal does not have a condition signal indicating a playback permission condition of said content signal when said playback restricting function is activated and said content signal is activated when said playback permission condition is acquired, and the acquired playback permission condition is satisfied.

13. The method of reproducing a content signal according to claim 12, wherein said playback permission condition is acquired via a communication section or from a condition storing section storing said playback permission condition.

14. A method of reproducing a content signal, comprising the steps of:
   determining, when a content signal is reproduced, whether said content signal has a control signal indicating whether a playback restricting function is activated for restricting reproduction of said content signal; and
   when it is determined that said content signal has said control signal, outputting said content signal when a playback permission condition allowing reproduction of said content signal is satisfied, wherein when said content signal includes a condition signal indicating a playback permission condition and said playback condition is activated, said content signal is outputted when the condition indicated by said condition is satisfied,
   wherein, when said playback permission condition is satisfied, an encryption key is generated based on said control signal, key information included with said content signal and said condition signal, and a content signal which has been decrypted using said encryption key is outputted.

15. method of reproducing a content signal, comprising the steps of:
   determining, when a content signal is reproduced, whether said content signal has a control signal indicating whether a playback restricting function is activated for restricting reproduction of said content signal; and
   when it is determined that said content signal has said control signal, outputting said content signal when a playback permission condition allowing reproduction of said content signal is satisfied,
   wherein, when said content signal is encrypted and has test data added thereto enabling determination as to whether decryption has been completed properly, said content signal is outputted when said decryption is performed and it is determined by said test data that said decryption has been properly completed.

16. The method of reproducing a content signal according to claim 15, further comprising the step of notifying a user that the content signal cannot be outputted when it is not determined by said test data that the decryption has been properly completed.

17. A content signal reproduction apparatus comprising:
   a setting signal generation section for determining whether a content signal has a control signal indicating whether a playback restricting function is activated for restricting reproduction of said content signal, and for generating a setting signal enabling correct output of said content signal when it is determined that said content signal has said control signal and a playback permission condition allowing reproduction of said content signal is satisfied; and
   an output processing section for performing output processing of said content signal using said setting signal from said setting signal generation section.

18. The content signal reproduction apparatus according to claim 17, wherein said setting signal generation section extracts a condition signal indicating said playback permission condition from said content signal and outputs said setting signal when said playback permission condition indicated by said condition signal is satisfied.

19. The content signal reproduction apparatus according to claim 18, further comprising a communication section, wherein said setting signal generation section acquires said condition signal through said communication section when said condition signal cannot be extracted from said content signal.

20. The content signal reproduction apparatus according to claim 18, further comprising a storing section for storing said condition signal, wherein said setting signal generation section acquires said condition signal when said condition signal cannot be extracted from said content signal.

21. The content signal reproduction apparatus according to claim 17, wherein said setting signal generation section outputs an encryption key for correctly decrypting the content signal as said setting signal when a condition indicated by said condition signal is satisfied, and said output processing section performs decryption using said encryption key in outputting said content signal.

22. The content signal reproduction apparatus according to claim 21, wherein, when said content signal has test data added thereto enabling determination as to whether decrypting has been completed properly, said output processing section performs decryption and outputs said decrypted content signal when it is determined by said test data that the decryption has been properly completed.

23. The content signal reproduction apparatus according to claim 22, further comprising a notifying section for notifying status of operation, wherein, when said output processing section does not determine, using said test data, that the decryption has been properly completed, said notifying section notifies user that a content signal cannot be outputted.

* * * * *